United States Patent [19]
Cook

[11] 3,814,123
[45] June 4, 1974

[54] PRESSURE RELIEF VENT
[76] Inventor: Christie K. Cook, Box 201, Manvel, Tex. 77578
[22] Filed: May 22, 1972
[21] Appl. No.: 255,434

[52] U.S. Cl............................ 137/493.9, 251/333
[51] Int. Cl............................................ F16k 45/00
[58] Field of Search ... 137/493.9, 532, 534, 516.25; 251/332, 363, 172, 324, 333, 170

[56] References Cited
UNITED STATES PATENTS
1,918,337   7/1933   Jones ........................... 137/493.9
2,710,624   6/1955   Quist ......................... 137/493.9 X
3,095,113   6/1963   Bodley ....................... 137/493.9 X
3,510,103   5/1970   Carsello .......................... 251/333

Primary Examiner—Henry T. Klinksiek
Assistant Examiner—Robert J. Miller
Attorney, Agent, or Firm—Ranseler O. Wyatt

[57] ABSTRACT

A tank vent for relieving both pressure and vacuum in tanks, vessels and the like, having self aligning valves and novel seals for leak proof seating of the operating members after each opening.

1 Claim, 3 Drawing Figures

PATENTED JUN 4 1974  3,814,123

PRESSURE RELIEF VENT

SUMMARY OF THE INVENTION

A tank vent having dual operating members for selectively relieving pressure or vacuum and having seats for said operating members providing leak proof seals after each opening, said operating members being self aligning.

DESCRIPTION OF THE PREFERRED EMBODIMENT

Figure 3:
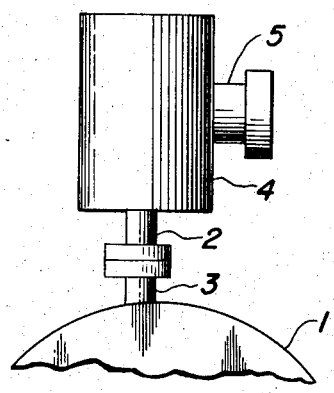
FIG. 3 is a side elevational view of the device as mounted on a tank.
Figure 1:
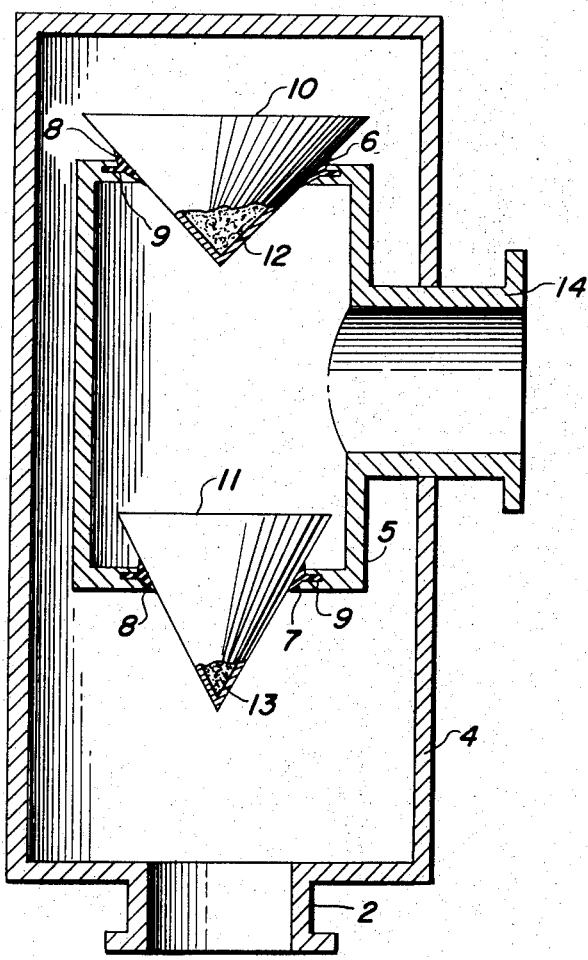
FIG. 1 is a side elevational view of the device in cross section.
Figure 2:
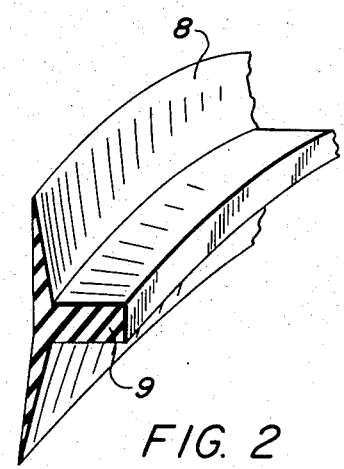
FIG. 2 is a fragmentary view of the sealing ring employed.

In the drawings the numeral 1 designates a tank or vessel containing material from which gas may form or in which vacuum may develop endangering ruptures or collapse of the tank or vessel. The conduit 2 is provided for connection to a conduit as 3 into the interior of the tank 1, the conduit 2 leading into the interior of the housing 4. A second housing 5 is enclosed within the housing 4 and a conduit 6 extends from the second housing into the atmosphere. If desired, a return line (not shown) may be connected to the conduit 14 and to another tank or vessel, such as a scrubber or other environmental protective apparatus.

The inside housing 5 has the upper port 6, and the lower port 7 formed therein and mounted in grooves formed in the respective faces of these ports 6, 7 are the seal rings 8, 8 which may be formed of suitable yieldable material, such as rubber, or the like, the rings 8, 8 having an annular body 9 which fits tightly in the grooves in the faces of the ports 6, 7 and the flared wings, which extend laterally from the outside annular face of said body member, receive the hollow conical operating members 10, 11. The operating members are provided with a preselected amount of weight, as 12, 13, in the downwardly extended ends, the amount of weight depending upon the point of pressure relief desired.

As pressure develops in the tank or vessel 1, it will move the operating member 11 off of the seat 8, upon reaching a predetermined degree of pressure, and will permit gas to escape through the inner housing 5 and out through the conduit 14. When a vacuum develops in the tank, to a predetermined degree, the operating member 10 will be lifted by the vacuum in the tank, out of the port 6, and air will be drawn into the tank through the conduit 14, to relieve the vacuum. In each instance, the operating member's movement off of the respective seat will be momentary and the distance traveled very short, and as soon as the pressure, or vacuum, is relieved, the respective operating member will drop back on to its seat, the wings of the seal ring having extended contact surfaces and being sufficiently flexible to receive the member and expand against the conical sides thereof, will tightly seal as the operating member seats on the rings in the ports. Due to the lateral spread provided, the rings will offer little resistance to the opening movement of the operating member. The weight in the ends of the operating members will provide a constant self aligning movement upon each opening.

While the device is shown mounted on a tank, and exhausting into the atmosphere, it is contemplated that the conduit 6 may be connected into a conduit leading into a scrubber or any environmental protection chamber.

Often a pressure build up within the tank becomes undesireable at even very low pressures, making it necessary to provide venting to maintain control of that pressure. With formation of the above described apparatus, particularly when made of chemical resistant material, where the weight additive in the operating members may be varied in minute amounts, pressure increase of from one half inch of water can be controlled whether it be internal pressure of vacuum. Where dangerous or undesirable gas is being released, the exhaust will be to a scrubber or other environmental protection apparatus.

The dual arrangement of operating members increases the sealing action, the pressure exerted against the operating member 11 also being applied to the top of the member 10, urging it against its seat, and the vacuum against the top of the operating member 10 applying equally against the operating member 11 will urge the member 11 against its seat.

What I claim is:

1. In a pressure relief vent, a housing, a pressure inlet in said housing, an inner housing within said first mentioned housing, a pair of ports in said inner housing and an outlet conduit extending from said inner housing through said outer housing, operating members seated in sealing relation in said ports, one of said members moving out of said sealing relation upon a predetermined degree of pressure entering said housing from said pressure inlet, said ports having annular grooves in the respective faces thereof and sealrings mounted in said grooves, said rings having an annular body portion from which lateral wings extend, said lateral wings extending behond the outer margins of said face and the full bearing surface of said wings bearing against said operating members when said members are in seated relation.

* * * * *